May 29, 1945.  E. SIEMERS  2,377,047
WELDING ELECTRODE HOLDER
Filed Nov. 8, 1943
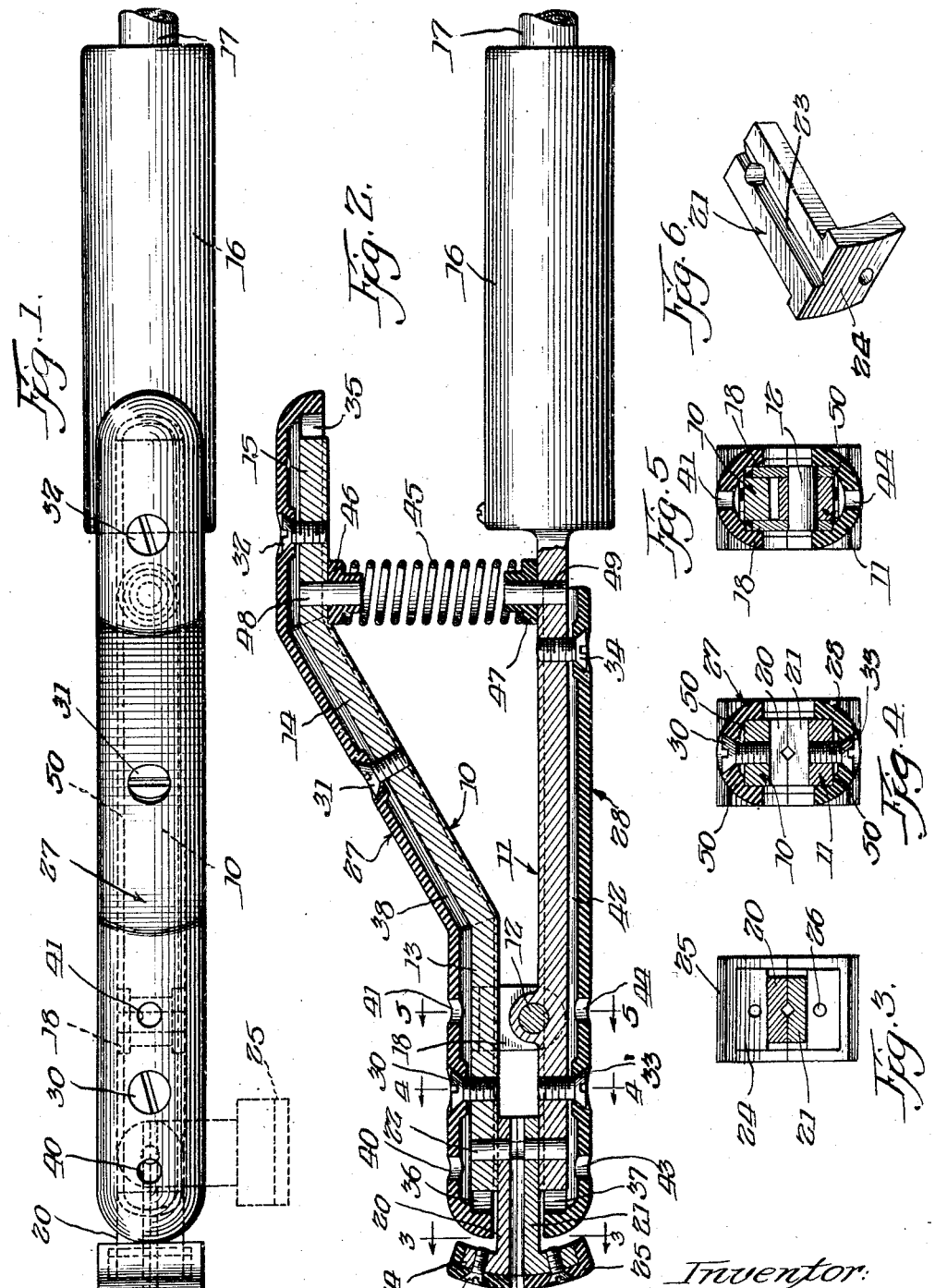
Inventor:
Eric Siemers Patented May 29, 1945

2,377,047

UNITED STATES PATENT OFFICE 2,377,047

WELDING ELECTRODE HOLDER

Eric Siemers, Kalamazoo, Mich., assignor to Roscoe B. Lacey, Kalamazoo, Mich.

Application November 8, 1943, Serial No. 509,345

7 Claims. (Cl. 219—8)

The invention relates to welding electrode holders and has reference in particular to an improved holder of this type which will be rugged in construction, having completely insulated jaws, and which will be capable of a long life by reason of the improved structure for cooling the operating parts thereof.

The present holder is completely insulated to eliminate the possibility of short circuiting when the holder is laid on metal parts that are grounded and to also prevent the breaking of the welding arc should the holder contact the clamps or other parts holding the metal being welded. The insulating covers as heretofore employed on electrode holders provided adequate insulation for the metal jaws but no attention was paid to the fact that the jaws as a result retained considerable heat from the welding operation and that the jaws and also the covers were thus at a much higher temperature which reduced their serviceable life. Therefore, a primary object of the invention is to improve the insulating covers as heretofore employed by arching them to facilitate the cooling of the jaws by dissipating the heat more rapidly.

A more specific object of the invention resides in the provision of a welding electrode holder having insulating covers on the metal jaws thereof of special arcuate contour for ventilating purposes and which covers are provided with holes to additionally increase the ventilating effect by allowing the heat from the jaws to escape.

Another object resides in the provision of clamping members for the welding rod having pivotal securement to the metal jaws of the holder to thereby reduce heat transfer from the clamping members to the jaws. By this reduction in heat transfer the jaws are correspondingly reduced in temperature and this effect is augmented by the pivoting of the clamping members since they are better ventilated and therefore they will contain less heat for transference to the metal jaws.

Another object of the invention is to provide a welding electrode holder having pivoted clamping members as above described constructed in a manner to form a shield to protect the insulating covers from sparks which are unavoidable in welding operations, particularly when a short welding rod is used.

With these and various other objects in view, the invention may consist of certain novel features of construction and operation, as will be more fully described and particularly pointed out in the specification, drawing and claims appended hereto.

In the drawing which illustrates an embodiment of the device and wherein like reference characters are used to designate like parts—

Figure 1 is a top plan view of the improved welding electrode holder of the invention;

Figure 2 is a sectional view through the pivotally connected jaws with the handle being shown in elevation;

Figure 3 is a transverse sectional view along line 3—3 of Figure 2 looking in the direction of the arrows;

Figure 4 is a transverse sectional view along line 4—4 of Figure 2;

Figure 5 is a transverse sectional view along line 5—5 of Figure 2; and

Figure 6 is a perspective view of a clamping member with its insulation removed.

In the drawing the improvements of the invention have been applied to a welding electrode holder including metal jaw members 10 and 11 hingedly connected by means of the pivot pin 12. The jaw member 10 includes a forward portion 13, a central diagonal portion 14 and a rear portion 15. Jaw member 11 is substantially straight throughout its extent, having suitably connected to the rear thereof the handle 16 of insulating material which provides a socket for receiving the end of the electric cable 17 whereby the holder is suitably connected to a source of electric current. The intermediate portion of jaw member 11 is formed to receive the pivot pin 12 which has connection with ears 18 located on the respective sides of the jaw members and which are welded or otherwise suitably secured to jaw 10. In order that the jaw members 10 and 11 may have a uniform width throughout they are recessed to receive the ears 18, as will be clearly understood by reference to Figure 5.

Each jaw member is provided with an electrode clamping member identified by numerals 20 and 21, respectively, by means of which a welding rod is clamped by the jaws and properly held by the operator for performing a welding operation. Each clamping member is preferably made of copper and heretofore it was customary to braze or weld the clamping member to its respective jaw. However, in accordance with the invention, each clamping member is pivotally secured to its jaw member by means of a pin 22 whereby the members may be rotated to a plurality of positions with respect to the jaws. For example, in Figure 1 the clamping members are shown in full lines in one position where they extend forwardly from the ends of the jaws. Another position is shown in dotted lines wherein the clamping members extend laterally to one side of the jaws. Said clamping members have their contacting faces each provided with a longitudinal groove 23, preferably V-shaped in contour, for clamping a welding rod. It is necessary to provide only one groove for receiving the welding rod since the clamping members have pivotal connection with the jaws and thus they may be swung to any position most convenient for the operator.

Referring to Figure 6, it will be observed that each clamping member is provided with a front shield portion 24, which shield portion extends upwardly on member 20 and downwardly on member 21. Said clamping members are thus constructed in a manner to form a protecting shield for protecting the jaw members and their insulating covering from sparks generated during the welding operation. It is desirable to electrically insulate each shield portion and thus their front surface is completely covered by the insulating cap 25, which cap is suitably retained in place by the countersunk screws 26. In order to completely cover all exposed surfaces of the respective shield portions, each insulating cap therefore extends around the sides of its shield portion and also extends over the top edge as regards member 20, and around the bottom edge as regard member 21. Only the rear surface of each shield portion is left uncovered and for reasons already advanced it is believed clear why it is not necessary to insulate said rear surfaces.

The jaw members 10 and 11 are also insulated by means of insulating covers 27 and 28, respectively. Cover 27 is secured to jaw 10 by means of countersunk screws 30, 31 and 32 located in the front, diagonal and rear portions of said jaw, respectively. In a similar manner cover 28 is secured to jaw 11 by the countersunk screws 33 and 34. The insulating covers include depending side portions which overhang the side edges of their jaw member to thereby cover all exposed metal surfaces. Also each insulating cover extends around the front edge of its jaw member and cover 27 likewise extends around the rear edge of portion 15. In Figure 2 said rear edge of jaw 10 is shown as square, whereas, the cover has a rounded edge, thus providing an opening 35. Similar openings 36 and 37 are provided at the front edge of the jaws 10 and 11 although it will be understood that said openings are not absolutely required and that the same can be eliminated merely by rounding the respective ends of the jaw members so that they conform to the curved ends of their covers.

To provide for better ventilation of the jaw members so that they will dissipate their heat more rapidly the insulating covers 27 and 28 are arched, as is clearly evident from the sectional view of Figures 4 and 5. The arching of cover 27 provides a space 38 under the cover extending from end to end of jaw 10 and by providing ventilating openings 40 and 41 the heat is conducted away from the jaw member and readily dissipated to the atmosphere. A longitudinal space 42 is formed under cover 28, having location between the cover and its jaw member 11. This space likewise extends for the length of the jaw and ventilating openings 43 and 44 conduct the heat from the member and thus maintain the same at a much cooler temperature.

It will be observed from Figure 2 that the rear portion 15 of jaw member 10 is spaced some distance from member 11. A coil spring 45 is located between the jaws in order to maintain said rear portions in spaced relation and which has the effect of yieldingly holding the clamping members 20 and 21 in contacting relation with each other so that a welding rod or the like will be firmly and securely clamped therebetween. The respective ends of coil spring 45 are insulated from the jaws by the insulating washers 46 and 47, said washer 46 being secured to jaw 10 by the metal stud 48, whereas, washer 47 is secured in a similar manner by stud 49 to jaw 11.

The welding electrode holder is completely insulated and therefore it is impossible for the holder to cause a short circuit by laying the holder on metal parts being welded. Also the insulating of the holder prevents the breaking of the welding arc should the holder contact metal clamps or other current conducting tools holding the parts being welded. The insulating covers for the jaws adequately insulate the same and in accordance with the invention said covers are arched transversely to provide a ventilating space between the cover and its jaw member which has the effect of facilitating the cooling of the jaw to thereby maintain the jaw members during the welding operation at a much lower temperature. Thus the jaws and the insulating covers have a much longer serviceable life. As best shown in Figure 4, each insulating cover in addition to being arched transversely is formed with internal shoulders 50 which have contact with the jaws and which shoulders thereby result in properly seating the insulating covers on their respective jaws.

The transfer of heat from the clamping members to their jaws is reduced to a minimum by the pivoting of each clamping member. The total surface contact between the parts is reduced and the pivoting of the clamping members provides for better ventilation and thus they contain less heat for transference to the metal jaws. In connection with said members a major improvement resides in the provision of the front shield portions. These portions are adequately insulated to prevent short circuiting by the holder and said shield portions perform the very desirable function of protecting the insulating covers from sparks which are unavoidable in welding operations, particularly when a short welding rod is used.

What is claimed is:

1. In a welding electrode holder, in combination, metal jaw members pivotally connected intermediate their length, an insulated handle secured to one end of one jaw member, a coil spring between the jaw members having location at the end adjacent the handle, and channeled covers of insulating material releasably secured to the respective outer surfaces of the jaw members to adequately insulate these metal parts of the holder, each cover having a substantially arcuate shape in transverse section to provide a ventilating space between the cover and its jaw member, shoulders provided on the inside surface of each insulating cover for properly seating the cover on its respective jaw member, and said covers each having an opening in the curved central portion thereof communicating with the ventilating space, whereby said spaces and openings facilitate the escape of heat from the jaw members, respectively, to maintain the members at a low temperature.

2. A welding electrode holder comprising pivotally connected metal jaw members, a handle of insulating material formed on one jaw member on one side of the pivot connection, an electrode clamping member pivoted to each jaw member and located on the opposite side of the pivot connection, said clamping members having their holding surfaces directed toward each other and having movement in a plane at right angles to the pivotal movement of the jaw members, a coil spring yieldingly maintaining the handle end of the jaw members in spaced relation to thereby apply holding pressure to the clamping members, and each clamping member including a protecting shield portion extending from the outer extremity thereof whereby the adjacent ends of the jaw members are protected during the welding operation.

3. A welding electrode holder comprising pivotally connected metal jaw members, a handle of insulating material formed on one jaw member on one side of the pivot connection, an electrode clamping member pivoted to each jaw member and located on the opposite side of the pivot connection, said clamping members having their holding surfaces directed toward each other and having movement in a plane at right angles to the pivotal movement of the jaw members, a coil spring yieldingly maintaining the handle end of the jaw members in spaced relation to thereby apply holding pressure to the clamping members, each clamping member including a protecting shield portion extending from the outer extremity thereof whereby the adjacent ends of the jaw members are protected during the welding operation, insulating material covering the outer surfaces of each jaw member to adequately insulate these metal parts of the holder, and caps of insulating material substantially covering said shield portions of the clamping members.

4. A welding electrode holder comprising pivotally connected metal jaw members, a handle of insulating material formed on one jaw member on one side of the pivot connection, an electrode clamping member pivoted to each jaw member and located on the opposite side of the pivot connection, said clamping members having their holding surface directed toward each other and having movement in a plane at right angles to the pivotal movement of the jaw members, resilient means yieldingly maintaining the handle end of the jaw members in spaced relation to thereby apply holding pressure to the clamping members, each clamping member including a protecting shield portion extending from the outer extremity thereof whereby the adjacent ends of the jaw members are protected during the welding operation, a channel member of insulating material covering the outer surfaces of each jaw member to adequately insulate these metal parts of the holder, and said channel members each having an arcuate shape in transverse section to form a ventilating space between the insulating member and its jaw.

5. A welding electrode holder comprising pivotally connected metal jaw members, a handle of insulating material formed on one jaw member on one side of the pivot connection, an electrode clamping member pivoted to each jaw member and located on the opposite side of the pivot connection, said clamping members having their holding surface directed toward each other and having movement in a plane at right angles to the pivotal movement of the jaw members, a coil spring yieldingly maintaining the handle end of the jaw members in spaced relation to thereby apply holding pressure to the clamping members, each clamping member including a protecting shield portion extending from the outer extremity thereof whereby the adjacent ends of the jaw members are protected during the welding operation, a channel member of insulating material covering the outer surfaces of each jaw member to adequately insulate these metal parts of the holder, said channel members each having an arcuate shape in transverse section to form a ventilating space between the insulating member and its jaw, and insulating caps substantially covering the said shield portions of the clamping members.

6. A welding electrode holder including in combination, metal jaw members pivotally connected intermediate their ends, resilient means located between the jaw members on one side of the pivot connection for yieldingly maintaining the jaw members in electrode holding position, an electrode clamping member pivoted to each jaw member on the opposite side of the pivot connection, said electrode clamping members having movement in a plane at right angles to the pivotal movement of the jaw members whereby a welding rod clamped by said members may be adjustably positioned laterally of the holder, a protecting shield portion provided by each electrode clamping member and extending from the outer extremity thereof, caps of insulating material substantially covering said shield portions, and channeled insulating members releasably secured to the outer surfaces of the jaw members respectively to adequately protect these metal parts of the holder, said insulating members each having a substantially arched central section whereby to form a ventilating space between the insulating member and its jaw member.

7. In a welding electrode holder, in combination, metal jaw members pivotally connected intermediate their length, an insulated handle located at one end of one jaw member, resilient means between the jaw members having location at the end adjacent the handle, channel-shaped covers of insulating material on the respective outer surfaces of the jaw members, each cover having an approximately arcuate central portion extending longitudinally thereof to provide a ventilating space between the cover and its jaw member, whereby each said space facilitates the escape of heat from its jaw member to maintain the same at a low temperature, and shoulders formed on the inside surface of each insulating cover for properly seating the cover on its respective jaw member.

ERIC SIEMERS.